United States Patent
LaVigne et al.

(10) Patent No.: US 7,894,426 B2
(45) Date of Patent: *Feb. 22, 2011

(54) CONDUIT PORT FOR NETWORK CHIPS

(75) Inventors: Bruce E. LaVigne, Roseville, CA (US);
John A. Wickeraad, Granite Bay, CA (US); Lewis S. Kootstra, Roseville, CA (US); Jonathan M. Watts, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1599 days.

This patent is subject to a terminal disclaimer.

(21) Appl. No.: 11/051,422

(22) Filed: Feb. 4, 2005

(65) Prior Publication Data

US 2006/0187913 A1 Aug. 24, 2006

(51) Int. Cl.
*H04Q 11/00* (2006.01)
(52) U.S. Cl. .............. 370/386; 370/390; 709/238; 710/100; 710/316
(58) Field of Classification Search .............. 370/394, 370/535, 389, 250, 402, 357, 386–388, 390; 709/252, 213, 238; 710/100, 316–317
See application file for complete search history.

(56) References Cited

U.S. PATENT DOCUMENTS

| | | | |
|---|---|---|---|
| 6,023,478 A * | 2/2000 | Kilk et al. .............. 370/535 |
| 6,496,477 B1 | 12/2002 | Perkins et al. |
| 6,701,088 B1 | 3/2004 | Watanabe et al. |
| 6,724,759 B1 * | 4/2004 | Chang et al. .............. 370/389 |
| 6,762,763 B1 | 7/2004 | Migdal et al. |
| 6,785,270 B1 | 8/2004 | Parrish et al. |
| 6,792,348 B2 | 9/2004 | Hameleers et al. |
| 6,847,618 B2 * | 1/2005 | Laursen et al. .............. 370/390 |
| 2002/0161847 A1 * | 10/2002 | Weigand et al. .............. 709/213 |
| 2003/0169739 A1 * | 9/2003 | Lavigne et al. .............. 370/394 |
| 2003/0177273 A1 * | 9/2003 | Nakamura et al. .............. 709/251 |
| 2004/0095927 A1 * | 5/2004 | Chang et al. .............. 370/388 |
| 2004/0174890 A1 * | 9/2004 | Chen et al. .............. 370/402 |
| 2005/0027881 A1 * | 2/2005 | Figueira et al. .............. 709/238 |
| 2006/0028993 A1 * | 2/2006 | Yang et al. .............. 370/250 |
| 2006/0215653 A1 * | 9/2006 | LaVigne et al. .............. 370/389 |

* cited by examiner

*Primary Examiner*—Kwang B Yao
*Assistant Examiner*—Jeffrey M Rutkowski

(57) ABSTRACT

Network devices and methods are provided for device monitoring. One embodiment includes a network device having a processor, a high speed interconnect and a number of network chips. The number of network chips are coupled to one another through the high speed interconnect. The number of network chips have a conduit port which can be selectively chosen to exchange packets, received to any network chip, with the processor.

15 Claims, 3 Drawing Sheets

CONDUIT PORT FOR NETWORK CHIPS

BACKGROUND

Internal to many network devices, e.g., switches and routers, there is often a processor responsible for processing packets used in the network device's global operation. These packets may arrive from across the network to any external network port on the network device, e.g., to an external port provided by a network chip installed on the network device. A given network device may have multiple network chips installed thereon with each network chip having multiple external ports. The network chips may be application specific integrated circuits (ASICs). The above described packets received to any of these external ports should be routed to the above mentioned processor in an efficient manner. Additionally, the packets from this processor should be capable of being sent out any appropriate external port or to local processing on any network chip.

The multiple network chips on a network device may be interconnected to one another via a high speed interconnect, e.g., a crossbar or internal switching fabric chip. In the past, one approach to providing packets received at the external network ports to a processor on the network device, i.e., the processor responsible for processing the packets used in the network device's global operation, was to put the processor access in a central place such as in the switching fabric. This approach introduces complex port forwarding logic into an otherwise straightforward crossbar switching fabric. Additionally this approach introduces two sets of code to keep in step with one another. Moreover, the approach is not available in a small network chip configuration which may not use a switching fabric chip.

Another approach to providing packets received at the external network ports to the processor responsible for processing those packets has been to wire up a special management blade, e.g., processor and memory chip dedicated to handling the exchange of those packets. In this approach the network device is hard coded so that all of this particular processor traffic goes through the management blade. The main disadvantage to this approach is that if the management blade fails or needs to be removed, the entire network device is down.

Yet another approach has been to wire up simultaneous connections from each network chip to the particular processor responsible for processing these packets. The disadvantage to this approach is cost. That is, the particular processor will have as many media access control-physical layer (MAC-PHY) ports as there are network chips on the network device which does not scale particularly well. Moreover, this approach becomes more cumbersome when the network device endeavors to provide redundancy among the processors responsible for processing the packets in the event a given processor is busy or down.

DETAILED DESCRIPTION

Embodiments of the present invention provide a conduit path for packets to flow to and from a processor responsible for processing packets used in a network device's operation. The embodiments allow for reusing much of the pre-existing forwarding and buffering structure of a given network device, e.g., a switch or router's forwarding and buffering structure. According to various embodiments, network chips (e.g., ASICs) are provided with an additional network port (hereinafter referred to as a "conduit" port) internal to the device for the purpose of exchanging packets with the processor responsible for processing the packets. The additional conduit port is a media access control-physical layer (MAC-PHY) type port and includes logic circuitry associated therewith to achieve the embodiments described herein. The conduit port on one or more network chips of a given device includes a transmit and a receive side, e.g., output and input side. In one example embodiment, the output side of each conduit port is coupled to a multiplexor, allowing one network chip's conduit port to send packets to the processor's input port to the exclusion of other network chips. In this embodiment, the processor's output port is broadcast to the input side of each network chip's conduit port. According to various embodiments, hardware filtering logic on the network chip allows a given network chip to operate on packets relevant to that given network chip.

Figure 1:
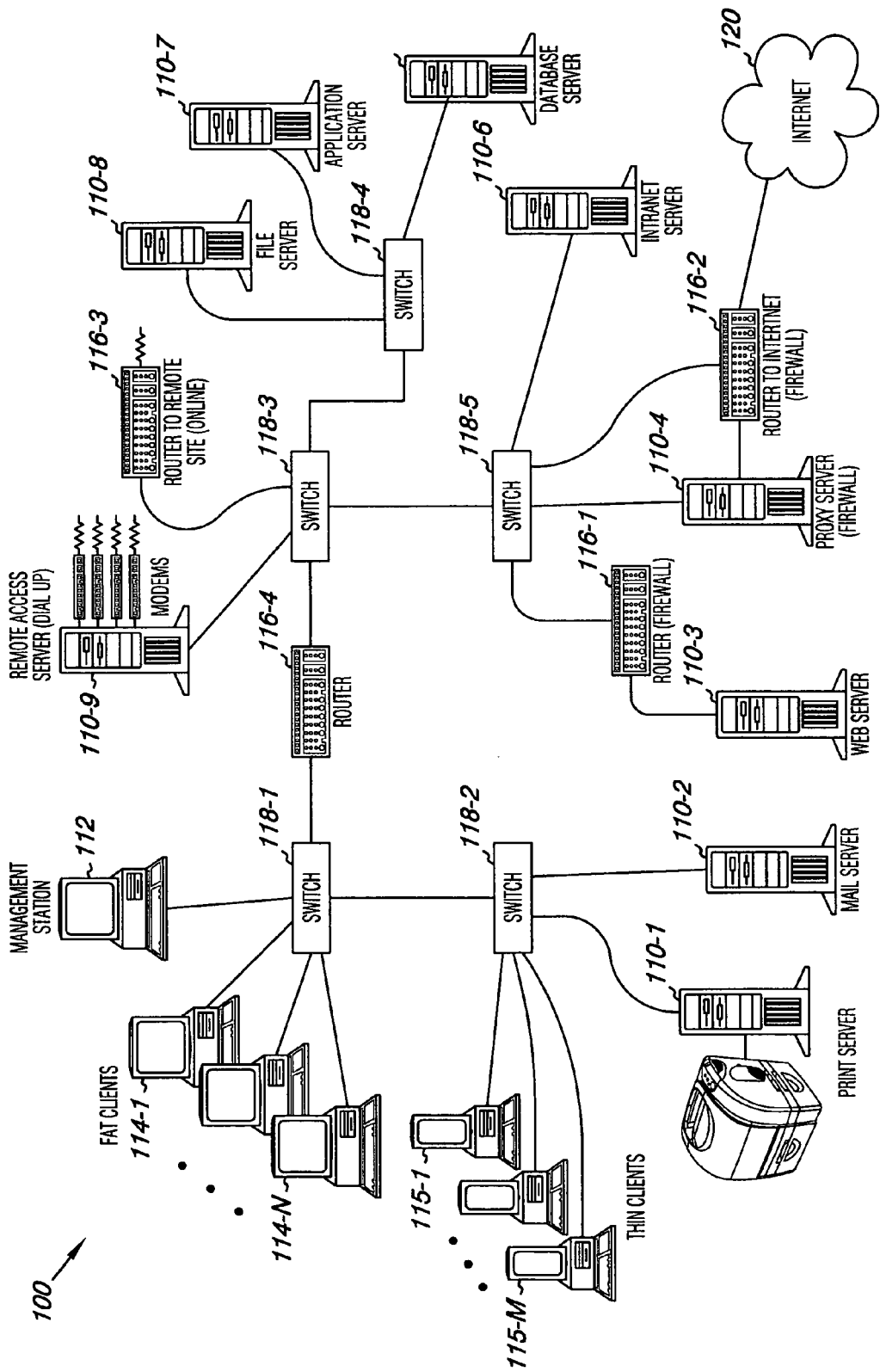
FIG. 1 is an embodiment of a computing device network.

FIG. 1 is an embodiment of a computing device network 100. As shown in FIG. 1, a number of devices, e.g., PCs, servers, peripherals, etc., can be networked together via a LAN and/or WAN via routers, hubs, switches and the like (referred to herein as "network devices"). The embodiment of FIG. 1 illustrates clients and servers in a LAN. However, embodiments of the invention are not so limited. For example, the embodiment of FIG. 1 shows various servers for various types of service on a LAN.

The exemplary network of FIG. 1 illustrates a print server 110-1 to handle print jobs for the network 100, a mail server 110-2, a web server 110-3, a proxy server (firewall), a database server 110-5, and intranet server 110-6, an application server 110-7, a file server 110-8, and a remote access server (dial up) 110-9. Again, the examples provided here do not provide and exhaustive list. The embodiment of FIG. 1 further illustrates a network management station 112, e.g., a PC or workstation, a number of "fat" clients 114-1, ..., 114-N which can also include PCs and workstations and/or laptops, and a number of "thin" clients 115-1, ..., 115-M which can include terminals and/or peripherals such as scanners, facsimile devices, handheld multifunction device, and the like.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks via routers, 116-1, 116-2, 116-3, and 116-4, and hubs and/or switches 118-1, 118-2, 118-3, 118-4, and 118-5, as the same are known and understood by one of ordinary skill in the art. Embodiments of the invention, however, are not limited to the number and/or type of network devices in FIG. 1's illustration.

As one of ordinary skill in the art will appreciate, many of these devices include processor and memory hardware. By way of example and not by way of limitation, the network management station 112 will include a processor and memory as the same are well known to one of ordinary skill in the art. Similarly, the network devices of routers, 116-1, 116-2, 116-3, and 116-4, and hubs and/or switches 118-1, 118-2, 118-3, 118-4, and 118-5 may include processor and memory resources. Embodiments of the invention are not limited, for the various devices in the network, to the number, type or size of processor and memory resources.

Program instructions (e.g., computer executable instructions), as described in more detail below, can reside on the various network devices. For example, program instructions in the form of firmware, software, etc., can be resident on the network 100 in the memory of a network management station 112 and/or one or more routers, 116-1, 116-2, 116-3, and 116-4, and hubs and/or switches 118-1, 118-2, 118-3, 118-4, and 118-5, and be executable by the processor(s) thereon. As the reader will appreciate, program instructions can be resident in a number of locations on various network devices in the network 100 as employed in a distributed computing network.

Data transfer between devices over a network is managed by a transport protocol such as transmission control protocol/internet protocol (TCP/IP). The IP layer in TCP/IP, contains a network address and allows messages to be routed to a different network or subnetwork (subnet). The physical transmission is performed by an access method, e.g., Ethernet, which is on the motherboard or in the network adapter cards (NICs) plugged into the network devices. Ethernet is a widely used local area network (LAN) access method, defined by the IEEE as the 802.3 standard. The actual communications path is the twisted pair, coaxial, or optical fiber cable that interconnects each network adapter.

By way of further example, program instructions in conjunction with a network management program can employ a protocol such as simple network management protocol (SNMP), routing information protocol (RIP), address resolution protocol (ARP), etc., to exchange data and collect response information from the various network attached devices shown in FIG. 1. That is, various network devices are employed to exchange network control signals and to transfer data packets, such as Ethernet frame packets as the same are known and understood, across the network 100 for various usage.

A processor on a given network device may communicate with other network devices using SNMP, RIP, ARP, or other networking protocols. Additionally, the processor on a given network device may communicate with local processors on network chips (described in more detail in connection with FIGS. 2A and 2B) using SNMP, RIP, ARP, or other networking protocols.

Figure 2A:
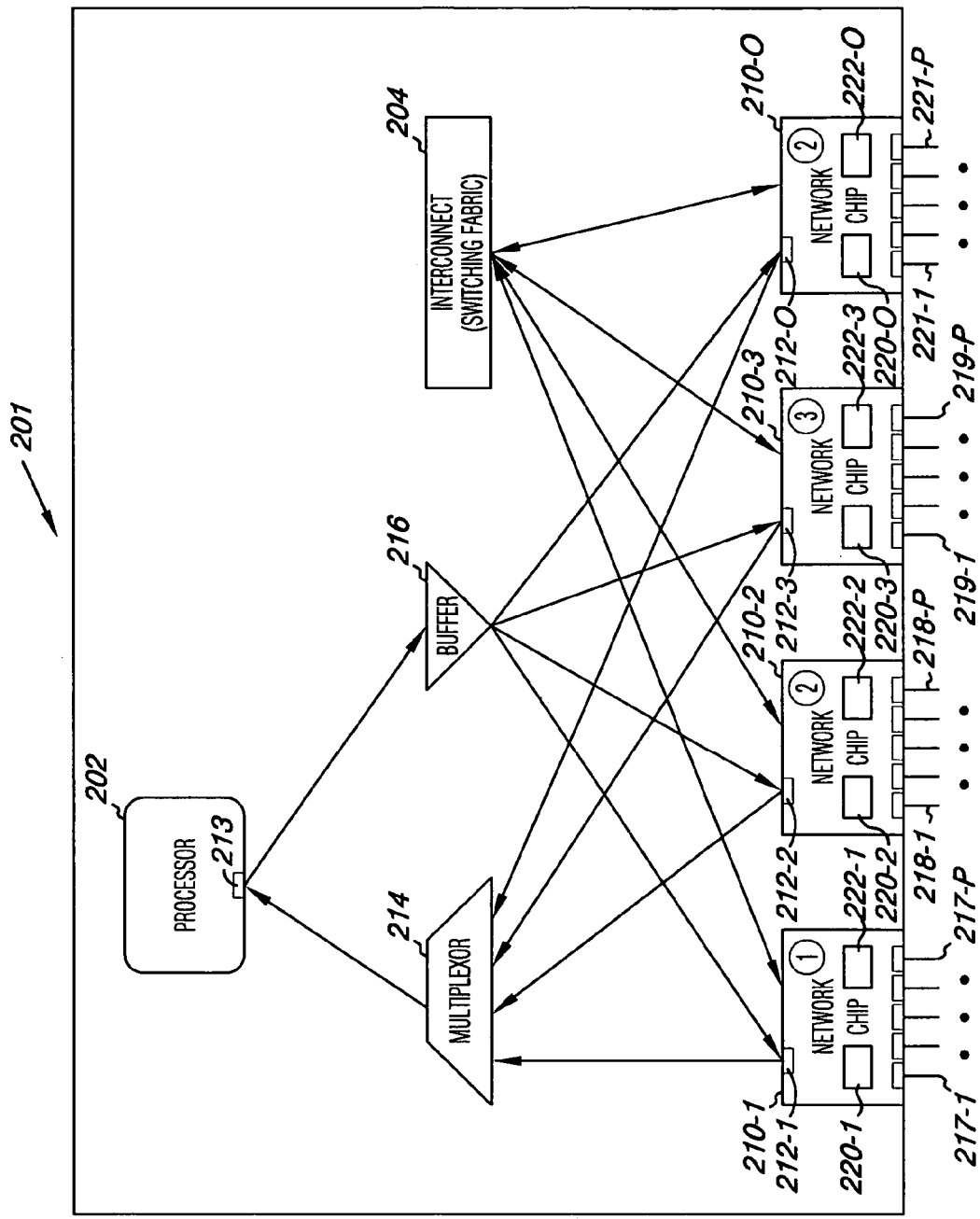
FIG. 2A illustrates an embodiment for a network device providing a conduit between a processor and network chips thereon.

FIG. 2A illustrates an embodiment for a network device 201 providing a conduit between a processor and network chips thereon. That is, FIG. 2A can represent a switch and/or router such as those illustrated and discussed in connection with FIG. 1. As shown in FIG. 2A, the network device 201 includes at least one processor 202 responsible for processing packets, used in the network device's operation, which are received to network chips on the device, e.g., network chips 210-1, 210-2, 210-3, . . . , 210-O. The network chips may be application specific integrated circuits (ASICs). The designator "O" is used to indicate that a number of network chips can be included on the network device 201. Each of these network chips may have access to processor and memory resources, shown as 220-1, 220-2, 220-3, . . . , 220-O and 222-1, 222-2, 222-3, . . . , 222-O respectively. As illustrated in FIG. 2A, the number of network chips 210-1, 210-2, 210-3, . . . , 210-O can be connected to one another through a high speed interconnect, e.g., switching fabric or crossbar circuit, 204 as the same are known and understood by one of ordinary skill in the art. Embodiments are not limited to the number of network chips included on a given network device 201.

Each of the number of network chips 210-1, 210-2, 210-3, . . . , 210-O are provided with external ports to handle the exchange of data packets, e.g., Ethernet packets, (hereinafter "packets") to and from the network device 201. For example, the network chip 210-1 is illustrated with external ports 217-1, . . . , 217-P. Network chip 210-2 is illustrated with external ports 218-1, . . . , 218-P. Network chip 210-3 is illustrated with external ports 219-1, . . . , 219-P. Network chip 210-0 is illustrated with external ports 221-1, . . . , 221-P. The designator "P" is used to indicate that a number of external ports can be included on a given network chip. Each of the network chips, however, does not have to include the same number of external ports. For example, one network chip, e.g., 210-1, could include 24 external ports where "P"=24, and another network chip, e.g., 210-3, could include 32 external ports where "P"=32, etc.

As noted above, internal to switches/routers, there is often a processor, e.g., 202, which processes packets of importance to the switch/router's global operation. These packets may arrive from any external network port, e.g., 217-1, . . . , 217-P, 218-1, . . . , 218-P, 219-1, . . . , 219-P, 221-1, . . . , 221-P (thus any network chip, e.g., 210-1, 210-2, 210-3, . . . , 210-O) and will have to be funneled to the processor 202 in an efficient manner. Previous approaches to doing so were described at the start of this application.

In contrast to earlier approaches, the embodiment of FIG. 2A provides a "conduit path", described in more detail below, for these packets to flow to and from the processor 202, re-using much of the pre-existing forwarding and buffering structure of the switch/router. The number of network chips 210-1, 210-2, 210-3, . . . , 210-O are provided with a designated "conduit port", shown as 212-1, 212-2, 212-3, . . . , 212-O respectively, for the purpose of exchanging packets with a processor, e.g., processor 202 responsible for processing the packets used in the device's 201 operation. FIG. 2A illustrates each of the number of network chips 210-1, 210-2, 210-3, . . . , 210-O being provided with a designated conduit port 212-1, 212-2, 212-3, . . . , 212-O. However, embodiments are not limited to this example and, as the reader will appreciate, there may be a number of additional network chips on a given network device 201 which do not include the herein described conduit port.

In one embodiment the conduit port 212-1, 212-2, 212-3, . . . , 212-O is an additional media access control-physical layer (MAC-PHY) port and includes logic circuitry associated therewith to achieve the embodiments described herein. That is, the additional MAC-PHY ports 212-1, 212-2, 212-3, . . . , 212-O can include MAC-PHY ports such as those used in local area/wide area networks (LAN/WANs) for external ports operating at 10/100/1000/10000 Mb/s speeds as the same will be known and recognized by one of ordinary skill in the art.

Each of these "conduit ports" 212-1, 212-2, 212-3, . . . , 212-O includes a media access control (MAC) functionality. Thus, each of these conduit ports 212-1, 212-2, 212-3, . . . , 212-O has a transmit and a receive side, i.e., output and input side, as part of its hardware structure. And, each of these conduit ports 212-1, 212-2, 212-3, . . . , 212-O is intended to selectively serve as part of a conduit path between the processor responsible for processing packets, e.g., 202, received to any network chip, e.g., 210-1, 210-2, 210-3, . . . , 210-O, and used in the operation of the network device 201.

As shown in FIG. 2A, the processor 202 is separate from the high speed interconnect 204. In one embodiment the processor 202 includes a single conduit port 213 (as "conduit port" has been defined herein) to receive packets from a selected conduit port 212-1, 212-2, 212-3, ..., 212-O on one of the number of network chips 210-1, 210-2, 210-3, ..., 210-O. The single conduit port 213 on the processor may similarly be a MAC-PHY port as used in local area/wide area networks (LAN/WANs) operating at 10/100/1000/10000 Mb/s speeds.

The reader will appreciate that the conduit port 213 on the processor 202 to receive packets from the selected conduit port 212-1, 212-2, 212-3, ..., 212-O on one of the number of network chips 210-1, 210-2, 210-3, ..., 210-O may be "built-in" to the processor 202. Additionally, the conduit port 213 may be external in the sense that the processor 202 may be a set of integrated circuit chips including processor, network interface card (NIC), and memory resources combined, etc.

The conduit port 213 has a receive side and a transmit side, i.e., input side and output side, as part of its hardware structure. The processor 202 on the network device 201 exchanges packets with a selected conduit port on one of the number of network chips, e.g., conduit port 212-1 on network chip 210-1, through a multiplexor 214 and a buffer 216. That is, the selected conduit port 212-1 is selected, e.g., controlled, by the multiplexor 214 and sends packets to an input side of the processor conduit port 213 associated with the processor 202. As shown in FIG. 2A, an output of each network chip conduit port 212-1, 212-2, 212-3, ..., 212-O on the number of network chips 210-1, 210-2, 210-3, ..., 210-O is coupled to the multiplexor 214 and the multiplexor 214 is used to choose a selected conduit port, e.g., conduit port 212-1, to send packets to the processor 202.

An output side of the conduit port 213 of the processor 202 is broadcast through the buffer 216 to an input side of the selected conduit port, e.g., 212-1. In various embodiments the buffer 216 broadcasts an output from the conduit port 213 on the processor 202 to an input side of each of the conduit ports 212-1, 212-2, 212-3, ..., 212-O on the number of network chips 210-1, 210-2, 210-3, ..., 210-O. According to various embodiments, hardware filtering logic is provided on each of the network chips 210-1, 210-2, 210-3, ..., 210-O as part of the conduit ports 212-1, 212-2, 212-3, ..., 212-O such that respective network chip can operate on packets received from the processor conduit port 213. By way of example, and not by way of limitation, a network chip can filter packets based on a media access controller (MAC) destination address (DA) (also referred to as a destination MAC address), e.g., presented as the first 6 bytes in a packet. That is, in one mode, each network chip contains a 6 byte compare register, and if the value of the destination MAC address matches, then the packet is accepted by the particular network chip's conduit port. In another mode, for example with 32 network chips present, the low 33 bits of the destination MAC address (or DA_MAC) are used as a bitfield. In this example, each network chip knows which bit to look at to accept or drop the packet. In this example, the 33$^{rd}$ bit can be special and indicate to allow the one network chip which is currently serving as the conduit port, i.e., the one which the multiplexor has selected in the other direction, to be the only network chip which accepts the packet. This approach has practicality when a packet is to be sent from the processor 202 out an external port. That is, it is practical to have just one network chip forwarding the packet on without having to give a lot of consideration to which network chip may be best suited. In other words, if the one network chip which is currently serving as the conduit port was good enough to get packets to the processor 202, then it is good enough to get packets out of the processor 202.

In some embodiments, a subset of the conduit ports 212-1, 212-2, 212-3, ..., 212-O on the number of network chips 210-1, 210-2, 210-3, ..., 210-O are coupled to the multiplexor 214. In such embodiments, an output of the processor conduit port 213 is broadcast through the buffer 216 to an input side of the subset of the conduit ports 212-1, 212-2, 212-3, ..., 212-O on the number of network chips 210-1, 210-2, 210-3, ..., 210-O. Additionally, the number of conduit ports receiving packets ("listeners") from the buffer 216 does not have to equal the number of conduit ports which are selectable by the multiplexor 214 to send ("talkers") packets to the processor 202.

In various embodiments, each network chip will know which network chip is currently serving as the conduit port, i.e., the one which the multiplexor has selected, to send packets to the processor 202. In this manner, each network chip will know which network chip to send packets, e.g., via the interconnect 204, in order to use the conduit. An example description of how each network chip will know which network chip is currently serving as the conduit port is provided in copending, commonly assigned application, entitled, "Support Chip for Handling Network Chips on a Network Device" filed on even date herewith, and incorporated herein in full by reference. Thus, packets can be received to any external port, e.g., 217-1, ..., 217-P, 218-1, ..., 218-P, 219-1, ..., 219-P, 221-1, ..., 221-P (thus any network chip, e.g., 210-1, 210-2, 210-3, ..., 210-O), on the device 201 and will be forwarded to the selected conduit port, e.g., 212-1, to which the processor 202 is "listening" via the high speed interconnect 204. The particular conduit port from among the number of conduit ports 212-1, 212-2, 212-3, ..., 212-O is selected by the multiplexor 214 and sends packets to an input side of the processor conduit port 213.

Processed packets are broadcast from the output side of the single conduit port 213 of the processor 202 through the buffer 216 to the input side of the number of conduit ports 212-1, 212-2, 212-3, ..., 212-O where the processed packets can be operated upon and forwarded out an external port, e.g., 217-1, ..., 217-P, 218-1, ..., 218-P, 219-1, ..., 219-P, 221-1, ..., 221-P (thus any network chip, e.g., 210-1, 210-2, 210-3, ..., 210-O on the device 201) via the high speed interconnect 204. Similarly, the processed packets can be forwarded to local processing on the receiving network chip or on another network chip 210-1, 210-2, 210-3, ..., 210-O via the high speed interconnect 204.

Again, as noted above, in various embodiments a subset of the conduit ports 212-1, 212-2, 212-3, ..., 212-O on the number of network chips 210-1, 210-2, 210-3, ..., 210-O are coupled to the multiplexor 214. In such embodiments, an output of the processor conduit port 213 is broadcast through the buffer 216 to an input side of the subset of the conduit ports 212-1, 212-2, 212-3, ..., 212-O on the number of network chips 210-1, 210-2, 210-3, ..., 210-O. Additionally, the number of conduit ports receiving packets ("listeners") from the buffer 216 does not have to equal the number of conduit ports which are selectable by the multiplexor 214 to send ("talkers") packets to the processor 202.

As the reader will appreciate the processor associated multiplexor and buffer pair 214 and 216, described in connection with FIG. 2A, can be replaced or used in combination with a hub and/or switch.

Figure 2B:
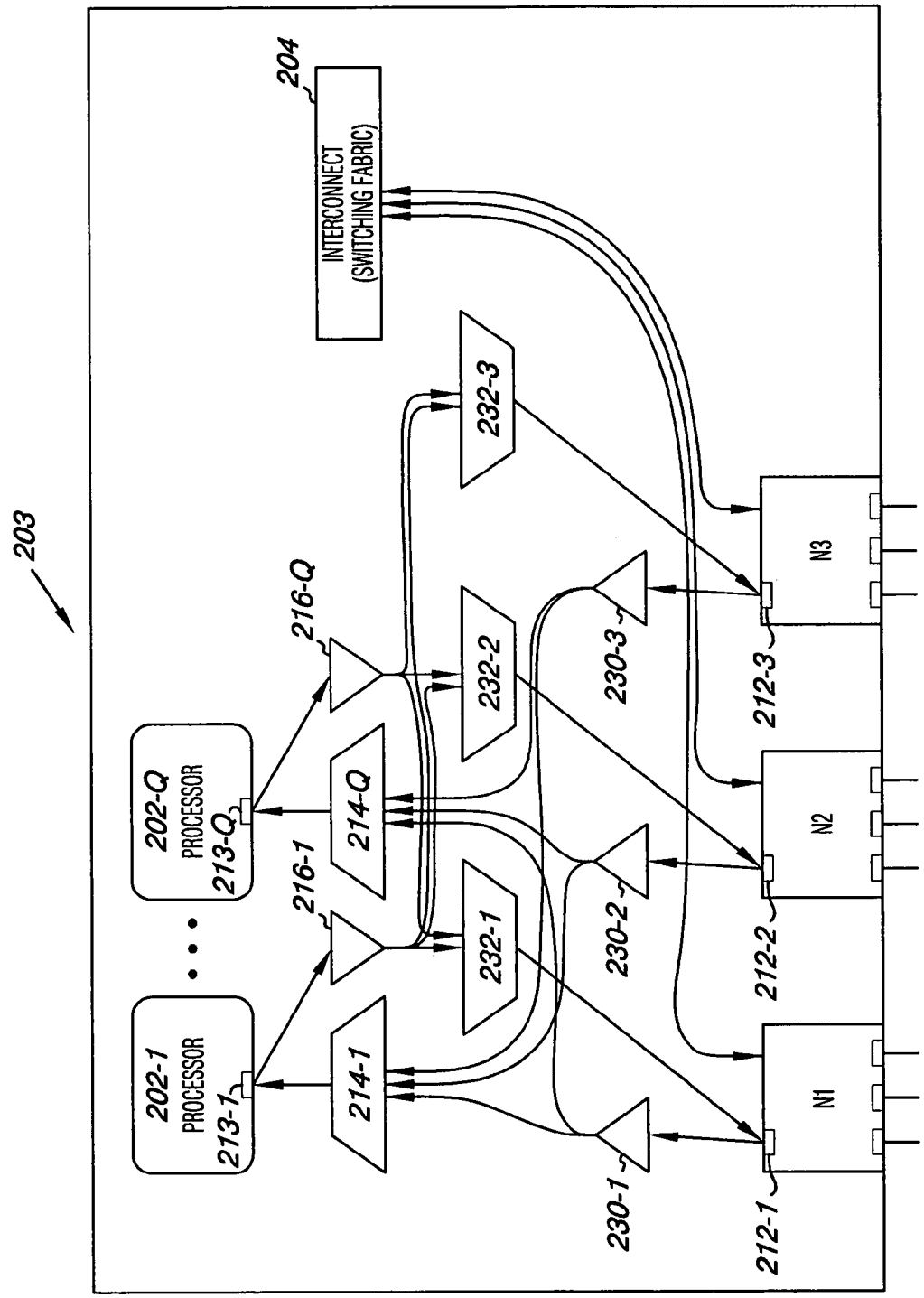
FIG. 2B illustrates another embodiment for a network device providing conduits between multiple processors and network chips thereon.

FIG. 2B illustrates another embodiment for a network device 203 providing a conduit between a processor and network chips thereon. The embodiment of FIG. 2B is analogous to the device discussed in connection with FIG. 2A. FIG. 2B, however, illustrates that a given network device 203 can include a number of processors 202-1, . . . , 202-Q to provide redundancy and/or multiple active processor resources on the device 203. In this embodiment, each of the processors 202-1, . . . , 202-Q responsible for processing packets exchanged to and from the external ports, e.g., 217-1, . . . , 217-P, 218-1, . . . , 218-P, 219-1, . . . , 219-P, 221-1, . . . , 221-P of the network chips 210-1, 210-2, 210-3, . . . , 210-O on the device 203 will similarly include a designated conduit port 213-1, . . . , 213-Q to exchange packets with the number of network chips 210-1, 210-2, 210-3, . . . , 210-O through an associated multiplexor and buffer pair, shown as 214-1, . . . , 214-Q, and 216-1, . . . , 216-Q, respectively. The designator "Q" is used to indicate that a number of redundant and/or multiple active processors responsible for processing packets exchanged to and from the external ports, e.g., 217-1, . . . , 217-P, 218-1, . . . , 218-P, 219-1, . . . , 219-P, 221-1, . . . , 221-P of the network chips 210-1, 210-2, 210-3, . . . , 210-O on the device 203.

In FIG. 2B, three network chips are shown for ease of illustration, however, more or less network chips can be utilized. The three network chips illustrated are labeled "N1", "N2", and "N3" and are analogous to the network chips described in connection with FIG. 2A with external ports and a designated conduit port, e.g., 212-1, 212-2, and 212-3, etc. However, as illustrated in the embodiment of FIG. 2B, the output side of each network chip's conduit port 212-1, 212-2, and 212-3 will be connected to a respective, independent buffer 230-1, 230-2, and 230-3 which will broadcast packets to the respective multiplexors 214-1, . . . , 214-Q. As described in connection with FIG. 2A, a given multiplexor 214-1, . . . , 214-Q will select from which conduit port 212-1, 212-2, and 212-3 to send packets to that multiplexor's associated processor.

As described in connection with FIG. 2A, packets from a particular processor 202-1, . . . , 202-Q will be output to that processor's associated buffer, e.g., 216-1, . . . , 216-Q. However, as illustrated in the embodiment of FIG. 2B, the broadcast from buffers 216-1, . . . , 216-Q will be to a multiplexor 232-1, 232-2, and 232-3 associated with a particular network chip, e.g., N1, N2, and N3, respectively. These multiplexors 232-1, 232-2, and 232-3 will select from which buffer 216-1, . . . , 216-Q broadcast to output to the input side of its associated network chip's conduit port, e.g., 212-1, 212-2, and 212-3, respectively.

As the reader will appreciate, network chip "N1" can be selecting to "listen" to packet traffic from processor 202-Q via the selection made on multiplexor 232-1. Likewise, network chip N1 could be selected by multiplexor 214-1 as having the conduit port to send packets to processor 202-1. Additionally, network chip "N3" can be selecting to "listen" to packet traffic from processor 202-1 via the selection made on multiplexor 232-3. And likewise, network chip N3 could be selected by multiplexor 214-Q as having the conduit port to send packets to processor 202-Q.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than the features of a single disclosed embodiment. Thus, the following claims are hereby incorporated into the Detailed Description, with each claim standing on its own as a separate embodiment.

What is claimed:

1. A network device, comprising:
    a number of network chips coupled to one another through a high speed interconnect on the device;
    a number of processors; and
    an independent multiplexor and buffer pair associated with each of the number of processors respectively;
    wherein the number of processors are responsible for processing packets, received to any network chip on the device, wherein each of the number of network chips has a number of external ports and additionally a designated conduit port to exchange packets with the number of processors, and wherein each processor includes a single conduit port to exchange packets with the number of network chips through the respective independent multiplexor and buffer pair;
    wherein a respective multiplexor of the pair is configured for selecting the designated conduit port on one of the number of network chips to exchange packets with a respective processor; and
    wherein each respective buffer of the pair is configured to broadcast an output from the single conduit port on the respective processor to an input side of each of the conduit ports on the number of network chips.

2. The network device of claim 1, wherein the selected conduit port sends packets to an input side of the single conduit port of the respective processor, and an output side of the single conduit port of the respective processor is broadcast through the respective buffer to an input side of the conduit ports.

3. The network device of claim 1, wherein the number of processors are separate from the high speed interconnect.

4. The network device of claim 1, wherein each of the conduit ports is an IEEE 802.3 media access control (MAC) port.

5. The network device of claim 1, wherein the device is selected from the group of a network switch and a network router.

6. The network device of claim 1, wherein the device is part of a local area network (LAN).

7. The network device of claim 1, wherein the number of network chips include hardware filtering logic such that certain network chips can operate on packets to send to a local processor and other packets will be operated on by only a particular network chip to be sent out one of the external ports.

8. The network device of claim 1, wherein the multiplexor in each pair is to select the conduit port on one of the number of network chips to exchange packets with the single conduit port on a selected processor.

9. The network device of claim 8, wherein the buffer in each pair is to broadcast an output from the single conduit port on the processors to a number of multiplexors, each of the number of multiplexors to select an input side of the conduit port on a particular network chip.

10. A method for moving packets on a network device, comprising:
using a number of network chips coupled to one another through a high speed interconnect of the device, the number of network chips each having a number of external ports, and additionally a designated conduit port to exchange packets received to the number of external ports, with a number of processors;
processing packets received to any network chip on the device with at least one of the number of processors;
exchanging packets with the number of network chips via a single conduit port on each of the number of processors and through an independent multiplexor and butler pair associated with each of the number of processors respectively;
selecting the designated conduit port on one of the number of network chips with a respective multiplexor of the pair to exchange packets with a respective processor; and
broadcasting an output from the single conduit port on the respective processor to an input side of each of the conduit ports on the number of network chips with the respective buffer of the pair.

11. The method of claim 10, wherein the method includes receiving packets to an external port of any network chip on the device and forwarding the packets to the selected conduit port via the high speed interconnect.

12. The method of claim 10, wherein the method includes broadcasting an output of the single conduit port on the respective processor through the respective buffer of the pair to an input side of a subset of the conduit ports on the number of network chips.

13. The method of claim 12, wherein the method includes providing hardware filtering logic on each of the number of network chips such that each network chip can operate on packets received from the single conduit port of the respective processor.

14. The method of claim 12, wherein the method includes forwarding the output broadcast to the subset of the conduit ports to an external port.

15. The method of claim 12, wherein the method includes forwarding the output broadcast to the subset of the conduit ports to local processing on a current or on another network chip via the high speed interconnect.

* * * * *

UNITED STATES PATENT AND TRADEMARK OFFICE
CERTIFICATE OF CORRECTION

| | | |
|---|---|---|
| PATENT NO. | : 7,894,426 B2 | Page 1 of 1 |
| APPLICATION NO. | : 11/051422 | |
| DATED | : February 22, 2011 | |
| INVENTOR(S) | : Bruce E. LaVigne et al. | |

It is certified that error appears in the above-identified patent and that said Letters Patent is hereby corrected as shown below:

In column 9, line 3, in Claim 9, delete "the processors" and insert -- the selected processors --, therefor.

In column 9, line 4, in Claim 9, delete "to select" and insert -- independently associated with --, therefor.

In column 9, line 18, in Claim 10, delete "butler" and insert -- buffer --, therefor.

Signed and Sealed this
Twenty-third Day of October, 2012

David J. Kappos
*Director of the United States Patent and Trademark Office*